United States Patent [19]

Pertessis et al.

[11] Patent Number: 4,804,901

[45] Date of Patent: Feb. 14, 1989

[54] MOTOR STARTING CIRCUIT

[75] Inventors: John Pertessis, Brooklyn, N.Y.; Joseph Knauer, Sedonad, Ariz.

[73] Assignees: Kilo-Watt-Ch-Dog, Inc.; KB Electronics, Inc., both of Brooklyn, N.Y.

[21] Appl. No.: 120,334

[22] Filed: Nov. 13, 1987

[51] Int. Cl.$^4$ .............................................. H02P 1/44
[52] U.S. Cl. ..................................... 318/786; 318/785
[58] Field of Search ............... 318/786, 787, 785, 778, 318/779

[56] References Cited

U.S. PATENT DOCUMENTS

| | | | |
|---|---|---|---|
| 3,414,789 | 12/1968 | Prouty | 318/286 |
| 3,740,631 | 6/1973 | Fricker et al. | 318/287 |
| 4,196,462 | 4/1980 | Pohl | 361/33 |
| 4,375,613 | 3/1983 | Fuller et al. | 318/786 |
| 4,605,888 | 8/1986 | Kim | 318/286 |
| 4,622,506 | 11/1986 | Shemanske et al. | 318/786 |
| 4,658,195 | 4/1987 | Min | 318/786 |

Primary Examiner—David Smith, Jr.
Attorney, Agent, or Firm—Jacobs & Jacobs

[57] ABSTRACT

A start circuit for an induction motor having a main winding and a start winding includes a sensor of main-winding current. A detector detects the level of main-winding current sensed by the sensor. The start circuit includes a reference generator driven by the level detector and providing a reference level proportional to an average value of main-winding current. The reference level can vary slowly in accordance with a long-term drift in magnitude of the main-winding current. A switch energizes and deenergizes the start winding in accordance with relative values of a signal of the detector and the reference level, thereby allowing for automatic restarting in the event of a sudden increase of current due to a motor stall.

7 Claims, 3 Drawing Sheets

MOTOR STARTING CIRCUIT

BACKGROUND OF THE INVENTION

This invention relates to starting circuits for electric motors having a main winding and a start winding and, more particularly, to a circuit which continuously monitors an average value of the magnitude of current in the main winding for switching electric power to the start winding.

A common form of electric motor is the induction motor which is manufactured in fractional horsepower capacities typically in the range of from one-quarter horsepower to one horsepower. Such motors are provided with two windings, one winding being the main winding and the other winding being a start winding, also known as a phase or auxilliary winding. The main winding continuously draws alternating current from a source of electric power throughout the operation of the motor. The start winding is required in addition to the main winding for generating a rotating torque field in order to initiate rotation of the motor shaft after which the start winding is disconnected from the source of power. In some motors, a capacitor may be included in series with the start winding, such motor being known as a split-phase motor or capacitor-start motor. In either case, the start winding must be energized for activation of the motor in the event of a stall or when initiating operation of the motor. The start winding is not to be energized during continuous operation of the motor to avoid burnout of the start winding. Also, there is no need for the start winding during continuous operation of the motor become rotation of the rotor in cooperation with the magnetic fields of the main winding induces the necessary rotating torque field for maintaining rotation of the rotor under load.

In order to disconnect the start winding from the source of power after rotation of the motor has commenced, various forms of circuitry have been employed. Some of these circuits take advantage of the relationship between main winding current and motor speed. The main winding current has a maximum value when the rotor is stationary, this value of current being referred to sometimes as a locked-rotor current. As the rotor begins to rotate, the current in the main winding begins to drop such that, at 75% of full speed of rotor rotation, the main winding current has dropped approximately 20% in magnitude. At full speed, the main winding current drops to a magnitude in the range of one-sixth to one-quarter of the locked-rotor current. One form of motor control circuit makes use of this relationship and operates with a threshold based on a testing of a specific model and size of motor. A relay responsive to the motor current is set to operate at the threshold to disconnect the start winding. Alternatively, an electronic switch set to the predetermined threshold has also been employed to disconnect the start winding. Methods of measuring the main winding current include the use of a sense resistor in series with the winding, as well as computerized circuitry which calculates peak value of the current based on measurements of the slope of the current waveform.

A problem arises in that the use of a fixed value of threshold is disadvantageous in that such threshold must be preset for each size and type of motor. In addition, such setting of the threshold presupposes that the operating voltage provided by a power supply will have its stated value. However, as is well known, the voltages of electric power sources, such as an incoming residential power line, may vary considerably depending on the loading of the line. Also, the characteristics of the motor itself may change in the event that the motor becomes heated. Also, computerized circuitry tends to be excessively costly.

A further disadvantage of the foregoing control circuitry lies in the fact that some of these circuits are designed to operate with initial values of current established when the motor is first activated. In the event of a stall due to a momentary overload, an operator must activate a switch to restart the motor. This is also true of starting circuits employing a timer. It is also noted that the circuitry employing a fixed value of threshold suffers from the disadvantage that it is not interchangeable among the various sizes and types of motors because of different requirements for specific settings of th values of threshold for the different motors.

SUMMARY OF THE INVENTION

The foregoing problems are overcome and other advantages are provided by a starting circuit for an electric motor having a main winding and a start winding. The starting circuit is constructed in accordance with the invention and includes means for sensing the magnitude of main winding current. Also included within the starting circuit is an electronic switch in series with the start winding for disconnecting and reconnecting the start winding to the source of power which drives the main winding. A circuit is provided for the generation of a reference level, or threshold, based on measurements of the winding current. A comparator compares the reference level to the present value of main winding current as sensed by the sensing means for operating the electronic switch. The switch can be activated at any time during the operation of the motor by the comparator whenever the threshold is crossed. The switch disconnects the start winding when the main winding current drops below the threshold, and reconnects the start winding whenever the main winding current rises above the threshold.

In accordance with a feature of the invention, the reference generation circuit comprises a resistor-capacitor circuit which is charged to a voltage proportional to a moving average of the main winding current. In addition, the starting circuit includes its own internal power supply which is activated simultaneously with energization of the main winding. The internal power supply experiences a delay in producing its output voltage and current for powering the starting circuit, the delay commencing with initial activation of the motor. The delay excludes the first few cycles of the AC (alternating current) voltage applied to the motor from entering into the generation of the threshold, thereby reducing the influence of current switching transients on the starting circuit.

The starting circuit is particularly advantageous in that the threshold is set at a predetermined fraction of a measured value of the main-winding current. After motor turn-on, the threshold rises rapidly towards the desired value so as to enable the comparator to activate the electronic switch. Thereafter, threshold value responds to any downward drift in main winding current as averaged over an interval of time in excess of approximately one-half minute. Future operation of the switch, as might occur during a temporary stall condition, is based on the average value of the main winding current.

The foregoing form of threshold generation circuit is particularly useful because it automatically adapts to any value of current in the main winding of split phase motors and capacitor start motors independently of the size of such motors. Thereby, a single circuit may be used for a quarter-horsepower motor as well as for a one horsepower motor without any need for presetting a specific value of threshold. Circuit parameter values are selected readily for adaptation of the starting circuit to various motor supply voltages.

BRIEF DESCRIPTION OF THE DRAWING

The aforementioned aspects and other features of the invention are explained in the following description, taken in connection with the accompanying drawing wherein.

DETAILED DESCRIPTION

Figure 1:
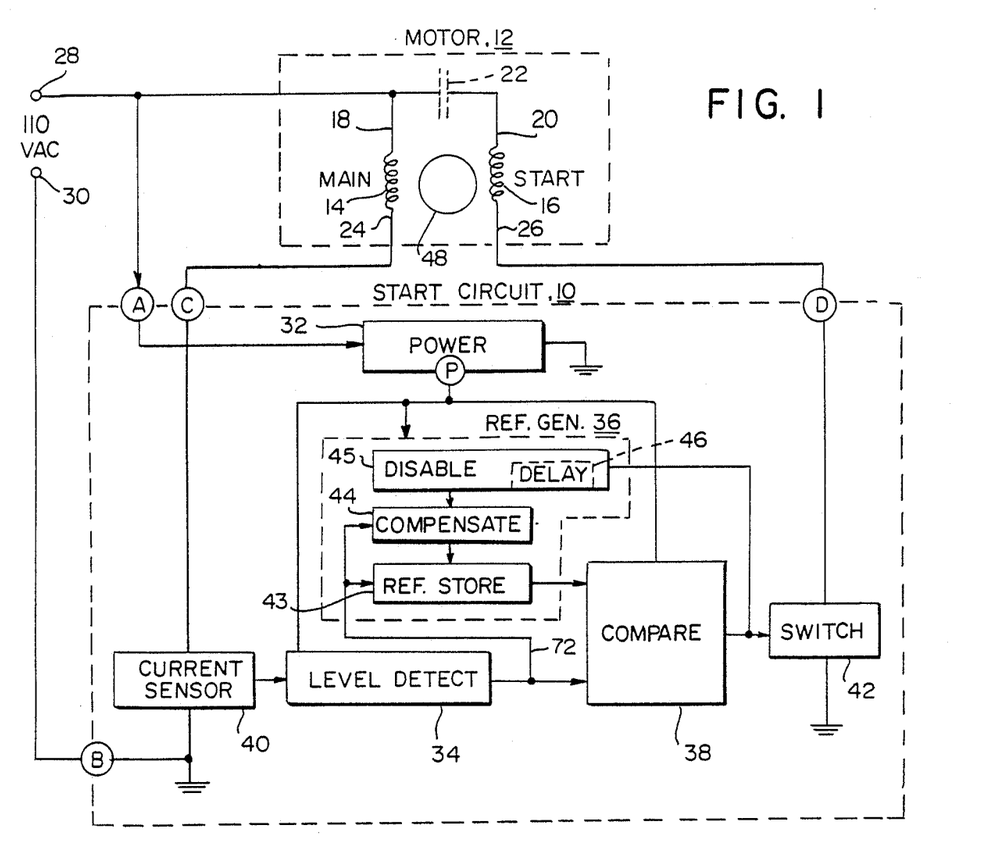
FIG. 1 is a block diagram of the motor starting circuit of the invention.

With reference to FIG. 1, there is shown a start circuit 10 incorporating the invention for use in starting an electric motor 12. The circuit 10 receives input electric power, such as 110 volts AC at terminals A and B. The input power may be of a voltage conventionally employed in residential electric circuits, or other electrical voltages suitable for driving a motor. The motor 12 is of a well-known induction construction having the form of either a split phase or capacitor start. The motor 12 comprises a main winding 14 and a start winding 16, the main winding also being known as a run winding and the start winding also being known as a phase or auxilliary winding. Terminal 18 of the main winding and terminal 20 of the start winding are connected together directly in the split phase form of motor (shown in FIG. 3), and are connected via a capacitor 22 (FIG. 1) in the capacitor-start form of motor. The capacitor 22 is shown in phantom since it may or may not be present depending on the form of motor. The start circuit 10 is operable with either form of the motor 12.

The motor 12 is connected in series with the start circuit 10 by means of a terminal 24 of the main winding 14 connected to terminal C of the circuit 10, and a terminal 26 of the start winding 16 connected to terminal D of the circuit 10. The input power is provided to the circuit 10 by a pair of lines 28 and 30 connecting respectively with terminals A and B of the circuit 10, and to the motor 12 via connection of the line 28 with terminal 18 of the main winding 14 and terminal 20 of the start winding 16. Line 30 may be either neutral or grounded depending on external considerations in the site of motor installation. By way of example in the ensuing description, line 30 is understood to be grounded at terminal B, the following description of operation of the invention applying equally well to the case wherein line 30 may be electrically neutral. It is to be understood, however, that the circuit 10 is operable with various power connections. For example, the circuit 10 can be operated with an AC voltage of 60 hertz, 50 hertz, or other frequency which may be employed. In the case of input power provided by a center-tapped transformer, wherein the center tap is grounded or at a neutral voltage and the transformer provides 220 volts, terminals A and B may be connected across the transformer terminals for receiving the 220 volts AC, or terminal B may be connected to the center tap for application of 110 volts AC between the terminals A and B.

The start circuit 10 comprises an internal power supply 32 which coverts the alternating current from the power lines 28 and 30 to direct current, at terminal P, for distribution to other components of the circuit 10 at a voltage suitable for their operation. The circuit 10 further comprises a level detector 34, a reference generator 36, and a comparator 38 which are powered by the supply 32. Also included within the circuit 10 are a current sensor 40 for measuring current in the main winding 14, and an electronic switch 42 operated by the comparator 38 for switching current on and off in the start winding 16.

The reference generator 36 comprises three sections, a capacitive storage unit 43 which stores a reference voltage based initially on the peak value of the main-winding current, a compensation unit 44 for retaining the value of the reference voltage during running of the motor 12 subsequent to the starting phase of the motor 12, and a disable unit 45 which disables the compensation unit 44 during activation of the start winding 16. Included within the disable unit 45 is a delay function 46 which retards activation of the compensation unit 44 for a preset delay after deactivation of the start winding 16 to desensitive the compensation unit from starting-current transients in the motor 12.

Figure 2:
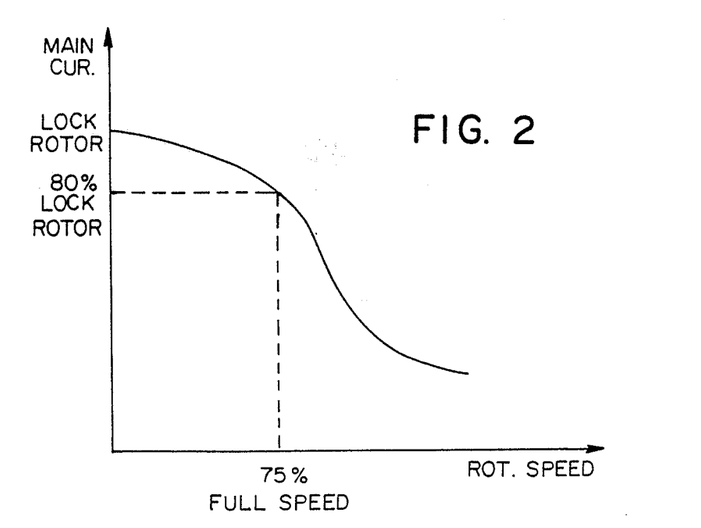
FIG. 2 is a graph of motor current in the main winding versus motor speed.

With reference also to FIG. 2, a graph shows a relationship between current in the main winding 14 and speed of rotation of a rotor 48 of the motor 12. A characteristic of the induction motor is the magnitude of current flowing in the main winding as a function of rotation speed. Maximum current flows when the rotor 48 is stationary, such a condition being referred to as a locked rotor. Upon rotation of the rotor, the main-winding current drops in magnitude, and reaches a value of 80% of the maximum current value when the rotor 48 has attained a speed of approximately 75% of full motor speed. The current then drops more rapidly with increasing speed of rotation, the main winding current reaching a value of approximately one-quarter to one-third of maximum value at full speed of rotation.

The foregoing relationship of current versus speed is employed by the start circuit 10 to determine when the motor 12 has reached the correct speed for switching current in the start winding 16. Initially, before rotation of the motor 48, the switch 42 is operated to apply current to the start winding 16. Later, after the rotational speed has reached a value of approximately 75% of full speed, the switch 42 is operated to terminate the start-winding current. Should the motor 12 stall during use, then the switch 42 is again operated to initiate current in the start winding 16, thereby to restart the motor 12. Such stalling can occur in a situation, by way of example, wherein the motor 12 is driving a variable load such as a grinding wheel wherein a person operating the motor may exert excessive force on the grinding wheel to stall the motor.

In accordance with a feature of the invention, all operating levels in the circuit 10 for determining when current is to be initiated and terminated in the start winding 16 are based on measurements of main-winding current. No preset levels are employed. Thereby, the circuit 10 may be employed with a motor drawing a relatively small amount of current or a relatively large amount of current. In addition, the characteristics of the motor may change during operation, such as a reduction in current due to increased resistance associated with increased running temperature, and the circuit 10 automatically adjusts the levels to correspond to the changed values of current. The level detector 34 responds rapidly to changes in current, as sensed by the sensor 40, to provide an output voltage to the comparator 38, which voltage tracks the present value of main-winding current. The level detector 34 also provides signals for operation of the reference generator 36 which responds more slowly to changes in main winding current. The magnitude of the reference provided by the generator 36 is stored, and is allowed to change slowly so as to follow any drifting in the value of main-winding current, such as that associated with the aforementioned change in electrical resistance. With respect to a downward drift in the main-winding current, a reference voltage outputted by the generator 36 follows a moving average value of the main-winding current. The comparator 38 operates in response to a difference in voltages outputted by the detector 34 and the generator 36. This operation of the circuit 10 will be explained now in further detail with reference to FIGS. 3, 4, and 5.

Figure 3:
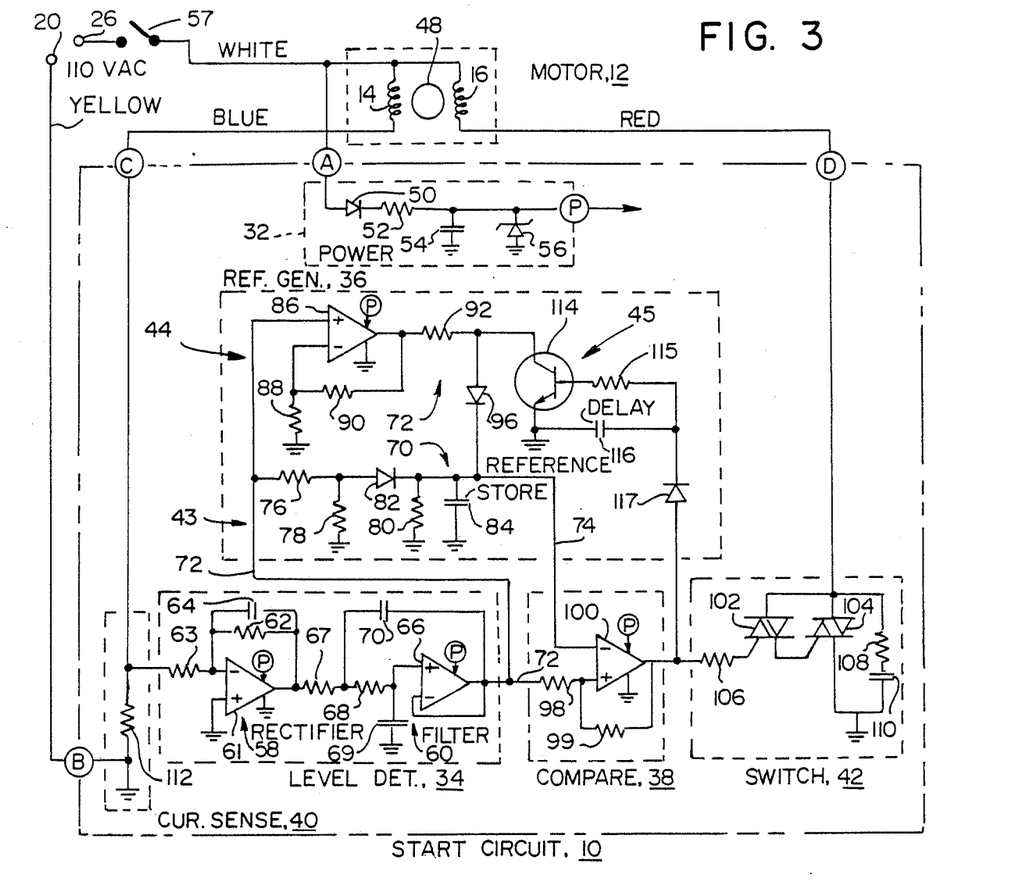
FIG. 3 is a schematic diagram of the motor starting circuit of the invention.

As shown in FIG. 3, the power supply 32 of the start circuit 10 comprises a diode 50, a resistor 52, a capacitor 54, and a zener diode 56. Alternating current from terminal A is applied via the diode 50 which rectifies the current. The diode 50 is serially connected by the resistor 52 to the capacitor 54 for charging the capacitor 54 with the rectified current. The resistor 52 in combination with the capacitor 54 provides a filter function for smoothing output voltage appearing at terminal P of the supply 32. The capacitor 54 and the zeneor diode 56 are connected in parallel between terminal P and ground, the zener diode 56 serving to regulate the output voltage to the preset zener voltage. The output voltage at terminal P is applied to a corresponding terminal P appearing in each of the units 34, 36, and 38 for supplying power thereto.

In the connection of an induction motor with a start circuit, it is common practice to identify the respective wires by use of color. Four wires are involved, and are colored red, blue, yellow and white. The white wire connects input power to the junction of the main winding 18 and the start winding 16 and also to terminal A of the start circuit 10. The yellow wires applies input power to terminal B of the start circuit 10. The blue wire interconnects terminal 24 of the main winding to terminal C of the start circuit 10. The red winding connects terminal 26 of the start winding to terminal D of the start circuit 10. This facilitates interconnections among the start circuit 10, the motor 12, and the source of input power. A switch 57 may be inserted in the white wire between the motor 12 and the input power line 28 to energize and to deenergize the motor 12 and the start circuit 10.

The level detector 34 includes a rectifier 58 and a filter 60. The rectifier 58 comprises an operational amplifier 61, two resistors 62 and 63, and a capacitor 64. In operation, the resistor 63 receives an input signal voltage from the current sensor 40, and inputs the signal voltage to the negative input terminal of the amplifier 61 The positive input terminal of the amplifier 61 is grounded. The resistor 62 and the capacitor 64 provides a feedback path between the negative input terminal and the output terminal of the amplifier 61. The power supply terminals of the amplifier 58 are connected between terminal P of the supply 32 and ground and, therefore, output a unipolar voltage in the form of a half-wave rectified sine wave. The capacitor 64 introduces an integration function to the rectifier 58 which tends to smooth pulsations in the rectified sine wave. The unsmoothed and smoothed pulsation of the rectified since wave are shown, respectively, in the solid and dashed traces in the second graph of FIG. 5.

The filter 60 comprises an operational amplifier 66, two resistors 67 and 68, and two capacitors 69 and 70. The resistors 67 and 68 are serially connected between an output terminal of the amplifier 61 and the positive input terminal of the amplifier 66. The capacitor 70 is coupled between an output terminal of the amplifier 66 and a junction point of the resistors 67 and 68. The capacitor 69 is coupled from the junction of the resistor 68 and the positive input terminal of the amplifier 66 to ground. The output terminal of the amplifier 66 is directly connected to the negative input terminal thereof. The combination of the resistor 68 and the capacitor 69 provide an integration function to the filter 60. The combination of the resistor 67 and the capacitor 70 provide a further integration function to the filter 60. The operation of the filter 60 has the advantage of an adequately fast response to pulsations in the smoothed rectified signal outputted by the rectifier 58, and sufficient integration capacity to produce on line 72 an essentially smooth indication of the magnitude of the main-winding current of the motor 12. Such smooth indication is most desireable to ensure against any chatterring in the operation of the switch 42. An output signal of the filter 60 is provided by the output terminal of the amplifier 66 and applied via line 72 to input terminals of the storage unit 43 and the compensation unit 44 of the reference generator 36, as well as to the comparator 38.

In the reference generator 36, the storage unit 43 and the compensation unit 44 output voltages which are summed together at line 74. The storage unit 43 comprises three resistors 76, 78, and 80, a diode 82 and a capacitor 84. In operation, the resistors 76 and 78 are connected in series between the output terminal of the amplifier 66 and ground to serve as a voltage divider, the junction of the resistors 76 and 78 serving as an output terminal of the voltage divider and being connected to an input terminal of the diode 82. The divider outputs a voltage equal to 80% of the voltage on line 72, this corresponding to the reference value of 80% of the locked-rotor current disclosed hereinabove with reference to FIG. 2.

The capacitor 84 and the resistor 80 are connected together in parallel between an output terminal of the diode 82 and ground. The filtered rectified voltage of the amplifier 66 is applied via the divider and the diode 82 to charge the capacitor 84. Charging of the capacitor 84 is accomplished via a time constant equal to the product of the resistance of the resistor 76 and the capacitance of the capacitor 84. The capacitor 84 discharges through the resistor 80 with a time constant equal to the product of the capacitance of the capacitor 84 and the resistance of the resistor 80. The charging time of the capacitor 84 is substantially less than the duration of a cycle of the AC input power, typically a 60 Hertz signal, on the input power lines 28 and 30 so as to follow any increase in current amplitude. The discharge time is sufficiently long, approximately one half minute, for storage of a voltage representative of the amplitude of main winding current in the motor 12.

The compensation unit 44 of the reference generator 36 comprises an operational amplifier 86, three resistors 88, 90, and 92, and a diode 96. The resistor 92 and diode 96 couple an output signal of the unit 44 for summation with the output signal of the unit 43. The output signal of the unit 43 appears across the capacitor 84, and the output signal of the unit 44 appears at the output terminal of the amplifier 86.

In operation, the signal outputted on line 72 by the level detector 34 is applied to the positive input terminal of the amplifier 86. The negative input terminal of the amplifier 86 is connected via the resistor 90 to the output terminal of the amplifier 86, and is also connected via the resistor 88 to ground. The resistor 90 serves as a feedback resistor. The output terminal of the amplifier 86 is coupled via the resistor 92 to circuitry of the disable unit 45. The gain of the amplifier 86 is established by the ratio of the values of resistance of the resistor 90 and the resistor 88. The resistance ratio is selected to provide a gain of approximately 2.9 in the preferred embodiment of the invention, this gain being equal to the ratio of the reference signal on line 74 to the voltage outputted by the sensor 40 during a normal running current of the motor 12. The ratio of 2.9 has been established experimentally by observation of motors which are available commercially. It is to be understood that, by way of example, special purpose motors may have other values of running current resulting in some other value of the ratio of reference voltage to voltage outputted by the sensor 40, in which case the resistance ratio of the resistors 90 and 88 would be altered to produce a corresponding value of the gain of the amplifier 86.

It is noted that the capacitor 84 of the storage unit 43 can be charged by two charging paths, either via the resistor 76 and diode 82, or the resistor 92 and diode 96. During the start phase in the operation of the motor 12, the voltage applied to the diode 82 exceeds the voltage applied to the diode 96 so that charging of the capacitor 84 is via the diode 82. During the run phase in the operation of the motor 12, the voltage applied to the diode 96 exceeds the voltage applied the diode 82 so that charging of the capacitior 84 is accmplished via the diode 96.

The foregoing factor of 2.9 applied to the charging of the capacitor 94 has been selected to compensate for a discharging of the capacitor 84, as will be explained subsequently with reference to FIG. 4, so as to provide for a substantially constant output voltage on line 74 as the main-winding current of the motor 12 assumes its full-speed value.

The comparator 38 comprises two resistors 98 and 99, and an operational amplifier 100 having a positive input terminal and a negative input terminal. The positive input terminal of amplifier 100 receives the output voltage from the level detector 34 via line 72 and resistor 98. The negative input terminal receives the reference voltage signal on line 74 from the reference generator 36. Both the resistors 98 and 99 are connected to the positive input terminal of amplifier 100, the resistor 99 being connected between the positive input terminal and the output terminal of the amplifier 100 to provide a feedback function. The connection of the two resistors 98 and 99 serve to stabilize the gain of the amplifier 100 in its use as a comparator. In view of the connections of electric power to the amplifier 100 between terminal P and ground, the output voltage of the amplifier 100, in its operation as a comparator, has either one of the voltage states, wherein one voltage state has a value of approximately zero volts, and the other state has a value approximately equal to the voltage at terminal P. The amplifier 100 outputs a signal, a relatively high voltage, for activating the switch 42 when the voltage of the level detector 34 exceeds the reference level on line 74. When the output voltage of the level detector 34 drops below the reference voltage on line 74, the output signal of the amplifier 100 of the comparator 38 shifts to an alternate value, near zero, which deactivates the switch 42.

The switch 42 comprises two triacs 102 and 104, two resistors 106 and 108, and a capacitor 110. The resistor 106 couples current of the output signal of the comparator 38 to a control electrode of the triac 102, the latter outputting a signal to the control electrode of the triac 104. The triac 104 is connected in series between terminal D and ground so as to conduct current through the start winding 16 of the motor 12. Upon activation of the switch 42 by the comparator 38, the triac 104 is placed in a state of conduction for conducting current through the start winding 16. Upon deactivation of the switch 42, the triac 104 is placed in a state of nonconduction for terminating the flow of current in the start winding 16. The first triac 102 provides sufficient power for operation of the second triac 104 for initiating and terminating start-winding current. The resistor 108 and the capacitor 110 are serially connected between input and output terminals of the second triac 104 to act as a snubber circuit for attenuating any voltage spikes which might otherwise develop as switching transients during a termination of start-winding current.

The current sensor 40 comprises a resistor 112 which is serially connected between terminal C and ground, so as to conduct current through the main winding 14 of the motor 12. The resistance of the resistor 112 is sufficiently small so as to provide no more than a negligible voltage drop in series with the voltage drop across the main winding. Thereby, the motor 12 is able to function without any significant effect of the series connection of the resistor 112. The voltage appearing across the resistor 112 is proportional to the main-winding current, and is amplified by the amplifier 61 of the level detector 34. The voltage gain of the amplifier 61 is determined by the ratio of the feedback resistor 62 to the input resistor 63, the latter being connected to the junction of the resistor 112 with the main winding of the motor 12. Typically, a gain of 40 is provided by the amplifier 61.

The disable unit 45 comprises a transistor 114, a resistor 115, a capacitor 116, and a diode 117. The transistor 114 includes a collector terminal connected to the junction of the resistor 92 and the diode 96, a base terminal connected to the resistor 115, and an emitter terminal connected to ground. The resistor 115 and the diode 17 are serially connected between the base terminal of the transistor 114 and the junction of the output terminal of the amplifier 110 and the resistor 106. The capacitor 116 is coupled between ground and the junction of the resistor 115 and the diode 117. In operation, the output voltage of the comparator 38 is applied across the base-emitter junction of the transistor 114. Thus, when the comparator output voltage is relatively high, base current is supplied via the resistor 115 to place the transistor 114 in a state of conduction. When the comparator output voltage is approximately zero volts, the transistor 114 is in a state of nonconduction. The diode 117 is poled to prevent any negative switching transients which may be present at the output of the comparator 38 from reaching the transistor 114, thereby to protect the transistor 114. During a state of conduction, the transistor 114 conducts current from the output terminal of the amplifier 86 via the resistor 92 to ground. Thereby, during a state of conduction, the transistor prevents the current outputted by the amplifier 86 from charging the capacitor 84. During a state of nonconduction of the transistor 114, current outputted by the amplifier 86 can pass via the resistor 92 and the diode 96 to charge the capacitor 84 without interference by the disable unit 45.

The delay function (identified by the numeral 46 in FIG. 2) is accomplished by operation of the capacitor 116. During a transistion in the state of the output voltage of the comparator 38 from a low voltage to a high voltage, current flows via the diode 117 into the capacitor 116. Sufficient base current for activating the transistor 114 is not provided by the resistor 115 until after a period of time, or delay, in which the capacitor 116 charges with current provided by the comparator 138. The amount of delay is preset to a desired value by selection of a suitbale value of capacitance for the capacitor 116. Also, during at transistion in the state of the output voltage of the comparator 38 from a high voltage to a low voltage, the diode 117 is initially back-biased as the capacitor 116 discharges by providing base current through the resistor 115 to the transistor 114. Thus, there is also a delay in the termination of the state of conduction in the transistor 114.

The connection of both the disable unit 45 and the switch 42 to the output terminal of the comparator 38 provides for operation of the disable unit 45 in concert with operation of the switch 42. Upon activation of the switch 42 to provide a start current to the motor 12, the disable unit 45 essentially grounds the junction of the resistor 92 and the diode 96, thereby back-baising the diode 96 to ensure that no electrical transients associated with operation of the start winding 16 are applied via the amplifier 86 to the capacitor 84. This provides insurance, in addition to that of the filter 60, against any undue influence of start motor transients upon a value of reference voltage stored within the capacitor 84. After deactivation of the switch 42, the delay imparted by the capacitor 116 prevents flow of current form the compensation unit 44 to the capacitor 84 until after all switching transients essentially have died out.

Figure 4:
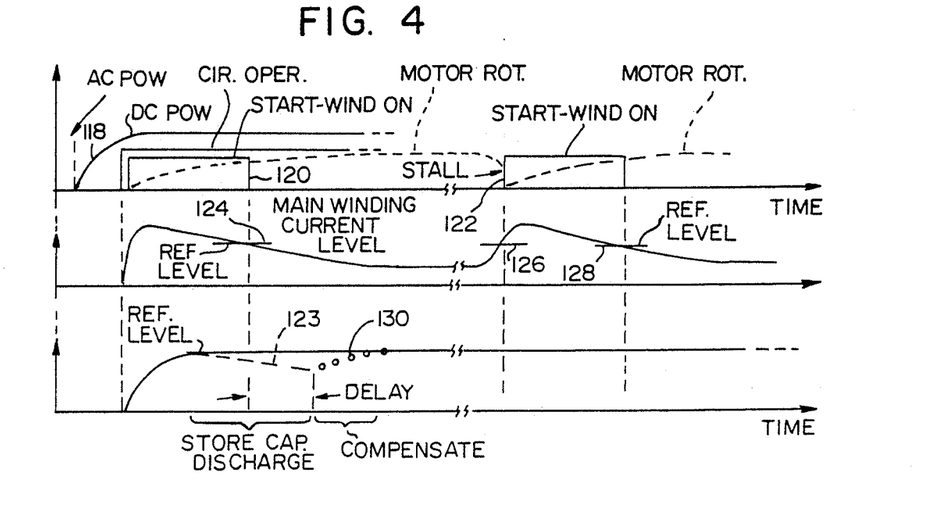
FIG. 4 is a timing diagram showing the operation of various portions of the starting circuit.

With reference also to the timing diagram of FIG. 4, the operation of the circuit of FIG. 3 is explained further. The timing diagram is composed of three graphs in time registration with each other. Near the left end of the top graph, the input AC power is turned on by a closure of the switch 57. Thereafter, current flows in the main winding of the motor 12, but there is no rotation of the motor because the start winding has not yet been energized. Also, upon closure of the switch 57 the capacitor 54 of the power supply 32 begins to charge, and the output voltage at terminal P begins to rise to provide DC (direct current) power as indicated at 118. When the output voltage at terminal P reaches a value suitable for operation of the start circuit 10, the amplifiers 61 and 86 become operative and the capacitor 84 begins to charge. The voltage on the capacitor 84 rises to a value which corresponds to 80% of the locked-rotor current by action of the voltage divider of the resistors 76 and 78. The rise in voltage of the capacitor 84 results in activation of the comparator 38 and operation of the switch 42. Therefore, as shown in the first graph of FIG. 4, the start winding of the motor 12 is energized momentarily after the circuit 10 begins operation. Thereupon, the rotor of the motor 12 begins to rotate, as indicated by a dashed line in the first graph of FIG. 4.

As the motor speed increases, the current in the main winding drops. At approximately 75% of full speed, the start winding is deactivated, as is indicated at 120. Thereafter, the motor speed increases until full speed is reached. With reference to the foregoing example of a person employing the motor to drive a grinding wheel, in the event that the person overloads the motor, the rotation slows down the motor stalls, as indicated at 122. The main-winding current rises upon the occurrence of the stall. The increased current is detected by the level detector 34 which, in turn, activates the comparator 38 to operate the switch 42 to energize the start winding of the motor 12. Thereupon, the rotor of the motor 12 beings to rotate as has been described above for the case of initial power turn-on. Upon increase of motor speed to approximately 75% of full speed, the start winding is again deenergized by operation of the switch 42.

The operation of the switch 42 for turning on current and turning off current in the start winding is further explained in the second graph of FIG. 4. The second graph shows the main-winding current level as detected by the level detector 34. The trace shown in the second graph is the output voltage of the detector 34. At the initial stage of operation of the start circuit 10, the voltage outputted by the detector 34 begins to rise and, as noted above, activates the comparator 38. The detector voltage is proportional to the magnitude of the mean-winding current. Thereafter, the detector voltage begins to drop as the magnitude of the main-winding current drops. As has been explained in FIG. 2, the main-winding current drops upon increase in rotation speed.

As the detector voltage drops, the state of charge of the capacitor 84 in the generator 36 is retained, except for a slow discharge via resistor 80 as indicated at 123 in FIG. 4, so that no corresponding drop of voltage occurs at the output signal of the generator 36 on line 74. The reference voltage level on line 74 is shown in the second graph at 124, and also at 126 and 128. As the output voltage of the detector 34 drops below the reference level at 124, the aforementioned action of the switch 42 takes place to terminate the start current. Later, at the time of the foregoing stall, the output voltage of the detector 34 rises in correspondence with the rising magnitude of the main-winding current. As the output voltage of the detector 34 passes the reference level at 126, the switch 42 is operated to initiate the start-winding current. Later, as the output voltage of the detector 34 drops below the reference level at 128, the foregoing operation of the switch 42 occurs to terminate the start-winding current.

The development of the reference level on line 74 is explained further with reference to the third graph of FIG. 4. There, the reference level on line 74 is shown by a solid line. There is a slight deviation from the reference level to due to the slow discharge of the capacitor 84 as the main-winding current drops below the locked-rotor value. The slow discharge is indicated by a dashed line at 123, shown somewhat exaggerated to facilitate explanation of the operation. It is noted that the voltage outputted by the amplifier 86 of the compensation unit 44 is greater than the voltage putted via line 72 to the storage unit 43 for charging the capacitor 84. Accordingly, after operation of the comparator 38 to deactivate the switch 42, and after the further delay produced by the capacitor 116 in the disable unit 45, current outputted by the amplifier 86 is applied via the resistor 92 and diode 96 to restore charge in the capacitor 84. This additional source of charging current compensates for the falling voltage on line 72. The compensation is indicated in the dotted line at 130 in the third graph of FIG. 4. The aforementioned multiplicative factor of 2.9 imparted by the gain of the amplifier 86 is generally sufficient to restore the value of the reference signal on line 74 to its desired value based on the measured magnitude of the normal running current of the motor 12. Accordingly, the reference level portrayed in the third graph of FIG. 4 is shown as a straight line. The staight line is an adequate approximation to the operation of the reference generator 36 for explanation of the operation of the start circuit 10. As has been noted hereinabove, the values of resistors in the start circuit 10 can be altered to accommodate other motor voltages, and other relationship between locked-rotor current and normal running current.

Figure 5:
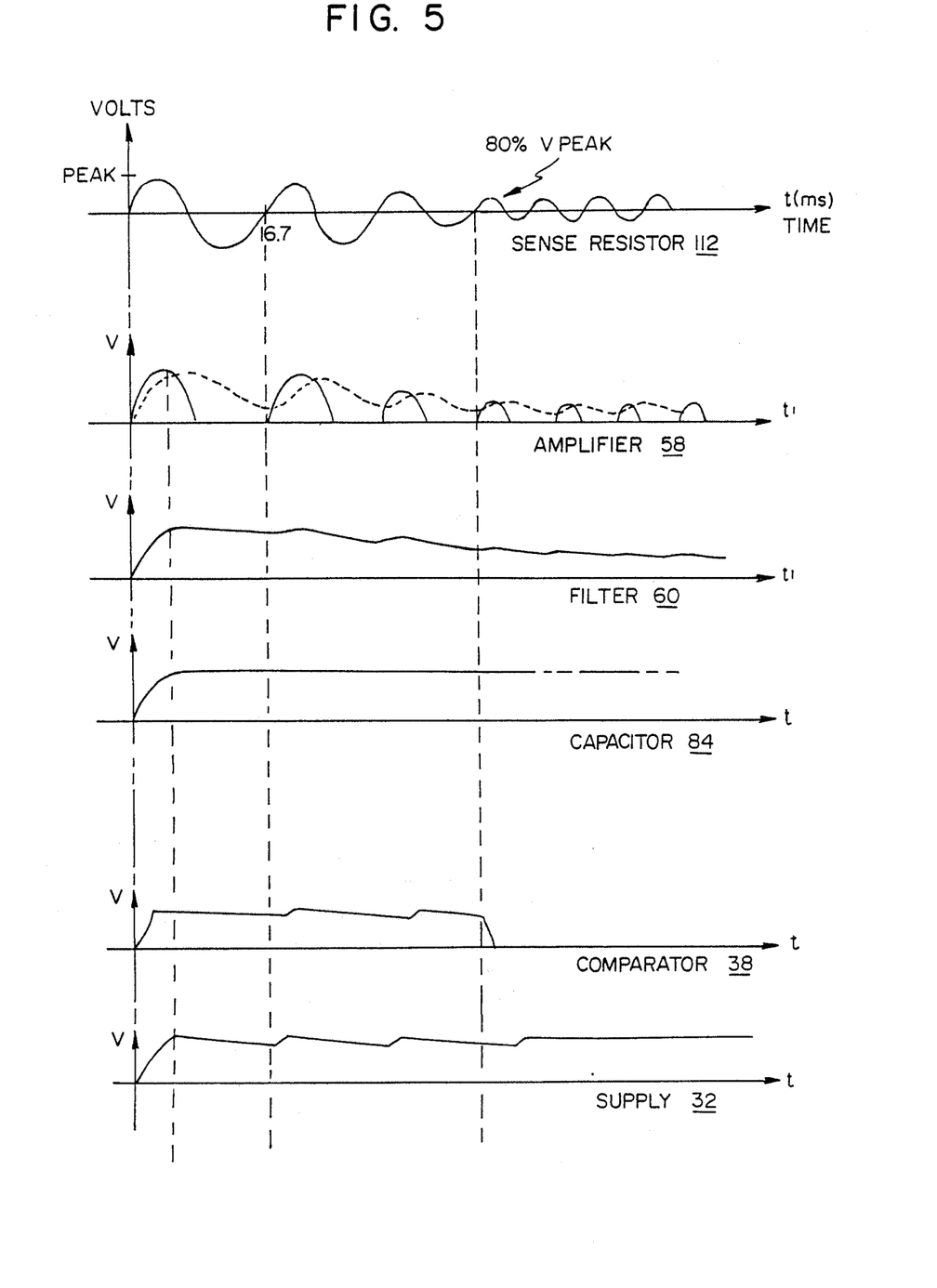
FIG. 5 shows signal waveforms at various locations within the starting circuit.

With reference also to FIG. 5, there are shown waveforms of voltages appearing at various points in the circuit of FIG. 3. The first graph shows the alternating voltage appearing across the sense resistor 112 in response to the flow of main-winding current in the motor 12. The peak voltage has initially a relatively high amplitude which decreases later is the speed of rotation increases. The dashed trace of the second graph shows the output of the amplifier 61 which amplifies, rectifies and smoothes the voltage across the sense resistor 112. The solid trace shows what the output of the amplifier 61 would be in the absence of capacitor 64, so as to demonstrate the smoothing feature of the capacitor 64. All of the graphs of FIG. 5 are in time registration with each other to permit a comparison of the waveforms of the respective graphs. The first graph also shows the time in milliseconds, the time for one cycle of the AC power corresponding to an alternating current at a frequency of 60 Hertz.

The third graph of FIG. 5 shows the voltage outputted by the filter 60. The fourth graph shows the voltage appearing across the capacitor 84 in response to a charging of the capacitor 84 by the rectified current from the filter 60. The fifth graph of FIG. 5 shows output voltage of the comparator 38. The output voltage has a ripple due to the partial charging and partial discharging of the capacitor 54 of the power supply 32 during each cycle of the incoming AC power. Peak values of the ripple are limited by the zener voltage of the diode 56. The bottom graph of FIG. 5 shows output voltage at terminal P of the power supply 32.

The foregoing circuitry is suitable for induction motors having main-winding currents for locked rotors in the range of from 5 amperes to 50 amperes. As is apparent from the foregoing operation, the reference level employed in the start circuit 10 is self adjusting, thereby permitting one circuit to be employed for a variety of motors and for a motor having characteristics which change in time due to heating or for other reasons. In addition, the operation of the start circuit 10 automatically restarts in the event of power termination, and automatically allows for restarting the motor in the event of a motor stall.

The following component values are provided, by way of example, in the construction of the start circuit 10 of FIG. 3. In the power supply 32, the resistance of the resistor 52 is 3300 ohms. The capacitor 54 has a capacitance of 10 microfarads. The zener value 56 has a zener voltage of 30 volts. In the compensation unit 44 of the reference generator 36, the resistors 88 and 90 have resistances of 100 kilohms and 270 kilohms, respectively, to provide a voltage gain of approximately 2.9. The value of resistance in the resistor 92 is 1.5 megohms. In the storage unit 43 of the generator 36, the resistors 76 and 78 of the voltage divider have values of 4.7 kilohms and 22 kilohms, respectively. The resistance of the resistor 80 is 22 megohms. The capacitor 84 has a capacitance of 4.7 microfarads. In the level detector 34, the resistors 63 and 62 have resistances of 4.7 kilohms and 4.7 megohms, respectively, for providing a voltage gain of approximately 40. The resistances of the resistors 67 and 68 are each 390 kilohms. The capacitances of the capacitors 64, 69, and 70 are, respectively, 0.01, 0.047 and 0.1 microfarads. The current sense resistor 112 has a value of 0.004 ohms for use with a motor having a locked-rotor current in the range of approximately 5–50 amperes. In the comparator 38, the resistors 98 and 99 have resistance values of 1000 ohms and 240 kilohms. In the disable unit 45, the component values of the resistor 115 and the capacitor 116 are 150 kilohms and 4.7 microfarads which produce a delay on the order of a fraction of a second. In the switch 42, the resistors 106 and 108 have values of 4700 ohms and 100 ohms, respectively, and the value of the capacitor 110 is 0.047 microfarads.

For motors having a substantially larger locked-rotor current, for example over 50 amperes, the magnitude of resistance of the current sensing resistor 112 may be halved, if desired. It is noted that the size of the resistor 112 is selected as a matter of design, and does not affect the operating point of the switch 42, which operation is based on the comparison of detected level with reference level, both of which are dependent equally on the voltage drop across the current sensing resistor 112.

Thereby, the foregoing circuit accurately controls the operation of the start winding while adapting to charging operating conditions of the motor.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A starting circuit for an electric motor having a main winding and a start winding, said starting circuit comprising:

means for sensing the magnitude of a current flowing in said main winding;

means coupled to said sensing means for generating a reference level which is proportional to an average value of said main winding circuit, said generating means including reference storage means and compensation means, said reference storage means having a capacitor and a resistor in a charge path for charging said capacitor to a voltage proportional to said average value by a first factor, said compensation means providing an additional resistive charge path for charging said capacitor to a voltage proportional to said average value of main winding current by a second factor larger than said first factor, said first factor being based on a value of main winding current obtained under a locked rotor condition, and said second factor being based on a value of main winding current obtaining during normal rotational speed of a rotor of the motor;

means for comparing said current magnitude with said reference level;

power supply means for activating said starting circuit after initial energization of said main winding; and switching means driven by said comparing means for terminating a flow of current in said start winding when the magnitude of current in said main winding drops below said reference level, and for initiating a current flow in said start winding when the magnitude of current in said main winding rises above said reference level.

2. A starting circuit according to claim 1 wherein said generating means further comprises diode means for combining output signals of said reference storage means and said compensation means to produce said reference level.

3. A starting circuit according to claim 1 further comprising disable means coupled between said compensation means and said comparing means for inhibiting an output charging current of said compensation means during operation of said start winding.

4. A starting circuit according to claim 1 wherein said sensing means includes rectifier means and filter means for extracting a moving average value of main-winding current.

5. A starting circuit according to claim 1 wherein said reference a storage means includes a voltage divider circuit for reducing a magnitude of output voltage obtained from said sensing means, and wherein said compensation means includes an amplifier for increasing a value of voltage obtained from said sensing means.

6. A starting circuit according to claim 5 further comprising:

disable means coupled between said compensation means and said comparing means for inhibiting an output charging current of said compensation means during operation of said start winding; and wherein said amplifier of said compensation means enlarges the voltage outputted by said sensing means subsequent to a starting of said motor, thereby to maintain a substantially constant value of said reference level.

7. A starting circuit according to claim 6 wherein a main-winding current of said motor decreases during an increase in rotation speed of said motor, and wherein said compensation means of said generating means is operative upon deactivation of said disable means during a reduction in magnitude of said main winding current to provide said substantially constant value to said reference level.

* * * * *